UNITED STATES PATENT OFFICE.

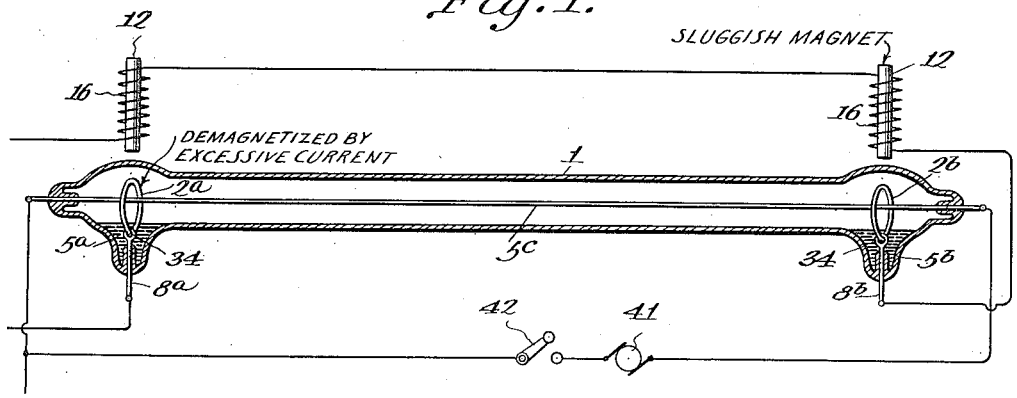
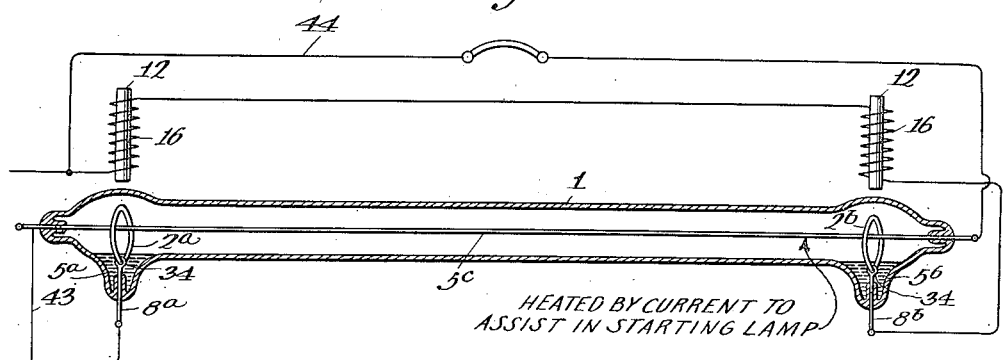
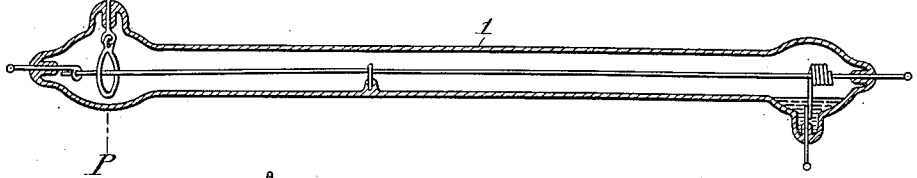

PETER COOPER HEWITT, OF NEW YORK, N. Y., ASSIGNOR, BY MESNE ASSIGNMENTS, TO COOPER HEWITT ELECTRIC COMPANY, OF HOBOKEN, NEW JERSEY, A CORPORATION OF NEW JERSEY.

VAPOR ELECTRIC DEVICE.

1,064,687. Specification of Letters Patent. Patented June 10, 1913.

Original application filed March 23, 1901, Serial No. 52,488. Divided and this application filed May 1, 1905. Serial No. 258,149.

*To all whom it may concern:*

Be it known that I, PETER COOPER HEWITT, a citizen of the United States, and resident of New York, county of New York, State of New York, have invented certain new and useful Improvements in Vapor Electric Devices, of which the following is a specification.

My invention relates to that class of electric apparatus in which the conducting medium is a vapor or gas. The apparatus may be used as a lamp or source of light or for various other purposes. In certain patents issued to me on the 17th day of September, 1901, for example, United States Patents numbered 682,690 and 682,695, I have described various forms of vapor or gas electric apparatus, and the present invention relates more particularly to means for conveniently starting and operating lamps or other gas or vapor electric apparatus in which the phenomena at the negative electrode constitute an important part of the resistance to starting.

I have found that in an apparatus having a vapor or gas path intervening between the negative and positive electrodes, under certain conditions of purity, there is an apparent reluctance on the part of the current to enter the negative electrode. I have further found that the tendency of the current is to assume a path between the positive electrode and that portion of the negative electrode which is remote therefrom. For instance, in a tube of considerable length constituting the inclosing chamber of the apparatus, if a conducting rod constituting an extension of the negative electrode be extended through a considerable portion of the length of the tube, the current will enter the negative electrode at a point, generally speaking, as remote as possible from the positive electrode, instead of traversing the extended conductor. The exact explanation of this phenomenon is not essential to a description of my invention. From experiments which I have made, however, I believe that it is proven beyond reasonable doubt that the current tends to remain in the vapor path as long as possible before entering the negative electrode.

For the purpose of starting the apparatus, I sometimes employ some special means for overcoming the initial reluctance of the current to traverse the space immediately surrounding the negative electrode. I have found, however, that by making an actual electrical contact between the positive and negative electrodes and then separating the two while current is flowing, it will continue to flow under the influence of a moderate difference of potential, the negative resistance phenomenon to starting having thus been eliminated.

I avail myself of the phenomenon of the reluctance of the current to enter the negative electrode by extending the negative electrode of the device to a point near the positive electrode and providing means for first bringing the two electrodes into electrical contact and then causing a break or open space to be made between the two whereupon the current which is first established at the junction is caused by the phenomenon to pass through the vapor and immediately traverse the device, entering the negative electrode remote from the positive electrode. Many different means may be employed for securing the initial contact between the electrodes and obtaining the break in the continuity thereof.

For purposes of illustration I may select a device containing mercury as the negative electrode, and I may cause a rod of some conducting material to pass from the negative electrode into and through a considerable length of vapor, that is to say, through practically the entire operating vapor path. In electrical contact with the remote end of this rod, I may bring the positive electrode (which may be of iron or other suitable material), and I may arrange the parts so that one or the other of the two electrodes shall be movable, whereby it shall be made possible to bring the electrodes into contact or separate them at will, or I may use a bridging piece for the same purpose. In order to render the operation of the movable electrode automatic, it may be of iron or I may connect with it a piece of magnetic material, such as iron, and I may cause this iron piece to be acted upon by a magnet or solenoid outside the inclosing vessel of the apparatus or by rotating the device may cause gravity to act. By including the two electrodes in the circuit of the magnet or solenoid, when the electrodes are in contact, I may cause the initial current passing through the contacting electrodes to separate the contacts and to bring about the condition in which the current selects the vapor path instead of the path through the solid extension of the negative electrode. Other means of separating the electrodes may be employed.

In the accompanying drawings, Figure 1 shows one form of device suited for the purpose of the invention; Figs. 2 and 3 illustrate modifications; Figs. 4 and 5 are sections of the apparatus shown in Fig. 3 taken in the line P P.

Referring to the drawings, 1 represents the inclosing tube or chamber of a gas or vapor device. The negative electrode, 5, may extend from one end of the device through the greater portion of the length thereof, the end remote from the positive electrode being surrounded in this instance by a small quantity of mercurcy, in case the vapor path of the device consists essentially of mercury vapor. The mercury assists also in protecting the portions of the glass surrounding the leading-in conductor, 8, which extends through the wall of the chamber. The mercury, moreover, is, during the operation of the device, volatilized to a greater or less extent and condensed within the chamber. This serves to dissipate the heat by reason of its volatilization.

In Fig. 2 I have illustrated a form of apparatus in which the extension of the negative electrode is completely cut out of circuit when the apparatus is in operation. In this instance, the conductor $5^c$ extends through the entire length of the apparatus and may be regarded as part of the electrode. It is shown as being surrounded near its respective ends by two rings $2^a$ and $2^b$ which when the apparatus is not in operation lie against the rod $5^c$ being pivoted at 34 and connected by leading-in wires $8^a$ and $8^b$. A small quantity of mercury may surround the base of each of these electrodes.

The operation of this device is as follows: When the circuit is closed therewith, current will pass through the respective rings $2^a$ and $2^b$, as well as the intermediate portion of the rod $5^c$, and, the connections being such as to cause the currents to traverse the coils 16, surrounding the cores 12, the contact rings $2^a$ and $2^b$ acting as armatures will be lifted from the wire, thus cutting the rod $5^c$ out of circuit. The current will then traverse the gas path between the two electrodes, either of the rings $2^a$ or $2^b$ acting as positive, and the electrode $5^b$ or $5^a$ acting as the corresponding negative electrode, depending on which may the current is flowing through the device. It will of course be understood that the rings $2^a$ and $2^b$ are either themselves magnetic or carry magnetic armatures.

If desired one of the magnets may be made to act more slowly than the other as in Fig. 1 so that the separation will take place at the corresponding electrode subsequent to the separation at the other electrode. The rings $2^a$ and $2^b$ may be made of such size that the one acting as a positive electrode will become heated to a red heat by the flow of an excess of current, and thereupon it will cease to be held up by the corresponding magnet, and will therefore fall back to its position of contact thus substantially cutting the device out and preventing it from being injured; returning, however, to its position of no contact when cooled.

Instead of causing the separation of the electrodes by electro-magnetic means, it is possible to use other instrumentalities as, for instance, an arrangement such as shown in Fig. 3, which resembles the structure shown in Fig. 2, but is so organized that by giving a slight rotation to the tube the positive electrode $2^a$ will be carried by gravity out of contact with the extension $5^c$ of the negative electrode.

In some cases it is desirable to heat the vapor within the apparatus, and I have found that the extension of the negative electrode may be employed for that purpose by the initial current passing therethrough, or current from another source may be caused to traverse this extension raising its temperature to the required degree and thus raising the temperature of the apparatus. This heating effect may be discontinued when the vapor has acquired the desired temperature. When the apparatus is in operation the heating current may be discontinued. A wire may be run through any of the devices to serve as a heater without interfering with the apparatus.

In Fig. 1, I have shown a separate source of current connected with the terminals of the rod $5^c$ such source being represented at 41, a suitable switch, 42, being connected in its circuit. The connections, however, may be derived from the same source as the main current, as also indicated by the conductors 43 and 44, Fig. 2, in which case a circuit-breaker 45, may be included in the circuit leading to the apparatus and adapted to act only after such an interval as will afford the proper amount of heating to the apparatus.

The apparatus illustrated in Figs. 3, 4 and 5 is designed to produce a separation of the electrodes by a movement of the container in distinction from a movement of one or both of the electrodes themselves. In these figures the movement may be a radial one caused by hand.

The present application is a division of my application Serial Number 52,488, filed March 23, 1901.

I claim as my invention:—

1. A mercury vapor apparatus comprising an exhausted container supported in a horizontal position and an electrode at each end, one at least of which includes a ring and an eye-bolt, and means, whereby a relative movement of the said ring and the other electrode will interrupt a metallic contact within the container.

2. A mercury vapor apparatus comprising a container for mercury, electrodes therein normally connected inside the container by good conducting material, and means whereby a movement of the said container will initiate a flow of current through the mercury vapor.

3. The combination of an exhausted envelop, electrodes therein, and means whereby movements of said container in opposite directions will alternately connect and disconnect said electrodes to initiate a flow of current therethrough.

4. A vapor device comprising a movable container, normally connected electrodes or contacts in said container and included in the main operating-circuit of the device, one of such electrodes being a conducting liquid, and means whereby a suitable movement of the container will make and break conductive connection between the said electrodes.

Signed at New York, in the county of New York, and State of New York, this 28th day of April A. D. 1905.

PETER COOPER HEWITT.

Witnesses:
 Wm. H. Capel,
 George H. Stockbridge.